US007784351B2

(12) United States Patent
Schumacher

(10) Patent No.: US 7,784,351 B2
(45) Date of Patent: Aug. 31, 2010

(54) FIELD DEVICE WITH INTEGRATED TEMPERATURE CONTROL

(75) Inventor: Mark Stephen Schumacher, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 70 days.

(21) Appl. No.: 12/288,082

(22) Filed: Oct. 16, 2008

(65) Prior Publication Data

US 2010/0095776 A1 Apr. 22, 2010

(51) Int. Cl.
*G01L 19/04* (2006.01)

(52) U.S. Cl. ........................................................ 73/708

(58) Field of Classification Search ........................ None
See application file for complete search history.

(56) References Cited

U.S. PATENT DOCUMENTS 3,661,015 A 5/1972 Paul
4,738,276 A 4/1988 Adams
4,865,360 A 9/1989 Adams
4,977,917 A 12/1990 Adams
5,458,008 A 10/1995 Rassatt
6,098,474 A 8/2000 Sartain et al.
2004/0035851 A1 2/2004 Antoniou et al.
2006/0051254 A1 3/2006 Seol
2006/0175051 A1 8/2006 Kinoshita
2009/0030634 A1* 1/2009 Schumacher ................. 702/85
2009/0180263 A1* 7/2009 Eriksen et al. .............. 361/752
2009/0293625 A1* 12/2009 Sundet et al. ................. 73/708
2010/0011869 A1* 1/2010 Klosinski et al. .............. 73/700

OTHER PUBLICATIONS

International Search Report and Written Opinion, PCT/US2009/005659.

* cited by examiner

*Primary Examiner*—Andre J Allen
(74) *Attorney, Agent, or Firm*—Kinney & Lange, P.A.

(57) ABSTRACT

A field device with integrated temperature control comprises a housing, a temperature sensor, a controller and a terminal block. The housing encloses internal components of the field device. The temperature sensor and the controller are located inside the housing. The temperature sensor senses an internal temperature of the field device, and the controller controls the internal temperature by regulating heat supplied to the field device. The terminal block connects to the controller in order to regulate the heater power as a function of the internal temperature.

20 Claims, 6 Drawing Sheets

11
10
19
12
16
15
14
25
26
Pwr-A,B
17
Reg-A,B
18
13
20
27
21
22
23
24
23

FIELD DEVICE WITH INTEGRATED TEMPERATURE CONTROL

BACKGROUND

This invention relates generally to field devices for process measurement and control. Specifically, the invention concerns a field device with integrated temperature control, in order to provide more direct protection against low-temperature extremes.

Field devices cover a broad range of process management devices that measure and control fluid parameters such as pressure, temperature and flow rate. Field devices have broad utility in a wide variety of applications including manufacturing, hydrocarbon processing, bulk fluid handling, food and beverage preparation, water and air distribution, environmental control, and precision chemical, glue, resin, thin film and thermoplastic applications.

Field devices include transmitters, which are configured to measure or sense process parameters, and controllers, which are configured to modify or control such parameters. Transmitters comprise sensor modules that sense fluid parameters, such as pressure transducers that generate analog voltage or current signals that characterize a process pressure. Sensor modules also include temperature sensors, flow sensors, PH sensors, level sensors, and a variety of other sensor devices for sensing or characterizing other process variables and fluid parameters.

In contrast to transmitters, controllers utilize control modules to modify or influence a process parameter, rather than simply characterize it. Control modules typically produce control outputs that represent target values for the parameter, such as analog current outputs used to position valves or otherwise achieve a desired flow rate. Control modules also include temperature controllers, pressure regulators, level controllers, and other process control devices.

More generalized field devices include pressure/temperature transmitters and other multi-sensor transmitters, as well as integrated flow controllers with both sensor and control functionality. Additional field devices combine sensing and control functions, such as hydrostatic tank gauge systems that simultaneously measure and regulate a number of related pressures, temperatures, fluid levels and flow rates.

Field devices are often exposed to a wide range of environmental effects, including temperature extremes due to changing ambient conditions or sunlight exposure, and process-related effects such as high temperature fluids or cryogenic flow. Low temperature extremes in particular can degrade transmitter and controller response, and produce offset, drift, or signal noise in associated electronics such as A/D (analog-to-digital) or D/A (digital-to-analog) converters. Extremely low temperatures can even result in malfunction or failure of the field device.

Environmental control is therefore a significant consideration for field device design. In particular, environmental enclosures are commonly utilized to shade field devices from sunlight and other radiant energy sources, and heaters are often added to protect from low temperature extremes. Existing heating and heat control technologies are unfortunately somewhat indirect, and suffer from increased power consumption and a larger overall size envelope. This raises costs and reduces installation flexibility, particularly in remote or limited-access applications. There is thus a continuing need for improved environmental control techniques that provide more direct temperature control, with a reduced impact on installed size and overall efficiency of the field device.

SUMMARY

This invention concerns a field device with integrated temperature control. The field device comprises a housing, an internal temperature sensor, a controller and a terminal block. The housing encloses internal components of the field device, including the temperature sensor and the controller.

The temperature sensor senses an internal temperature of the field device, and the controller controls the internal temperature by regulating heat supplied to the field device. The terminal block is connected to the controller in order to regulate the heat source, as a function of the internal temperature.

DETAILED DESCRIPTION

Figure 1:
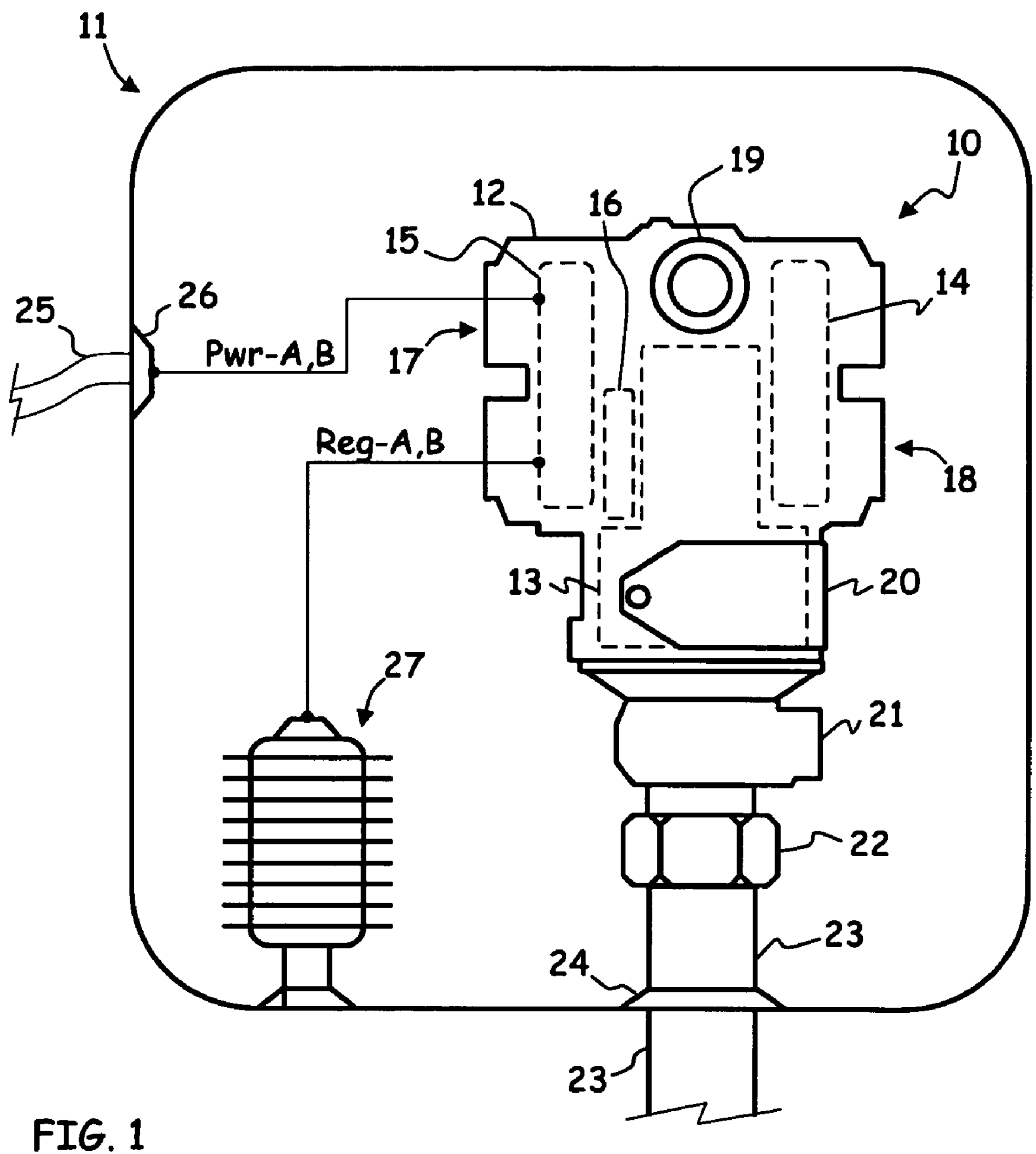
FIG. 1 is a cross-sectional schematic showing a field device with integrated temperature control, in an embodiment utilizing a dedicated terminal block.

FIG. 1 is a cross-sectional schematic showing field device 10 with integrated temperature control and environmental enclosure 11. Field device 10 comprises housing 12, field module 13, electronics board 14, terminal block 15 and internal temperature sensor 16. In this embodiment, terminal block 15 is a dedicated terminal block for regulating heat supplied to field device 10 and for linking field device 10 to a process control system, with connections shown in FIG. 2.

Housing 12 is typically manufactured of a durable material such as metal or a durable plastic, or a combination of such materials. The housing comprises internal mounting structures to enclose and secure internal components including field module 13, electronics board 14, terminal block 15 and internal temperature sensor 16. Housing 12 also insulates the internal components, shields from adverse environmental conditions such as moisture and corrosive or explosive agents, and protects from contact with process machinery, tools, falling objects, and other potential hazards.

In the particular embodiment of FIG. 1, field module 13 is a primary sensor module (or process parameter sensor module) configured to measure a pressure or other process parameter, and field device 10 is a described as a transmitter. In other embodiments field module 13 is a control module configured to control a process parameter, and field device 10 is described as a controller. In further embodiments field module 13 comprises a number of sensor and control devices for a more generalized field device, as described above. In some embodiments, the term "transmitter" is also used to describe housing 12 and the internal components of housing 12, independently of the process-wetted components of field device 10, or, alternatively, as a generic term to describe a generalized field device, regardless of particular configuration.

In typical embodiments, housing 12 comprises terminal cover 17, transmitter cover 18, conduit connection 19 and nameplate 20, as shown in FIG. 1, with external mount (or mounting structures) 21 for mounting field device 10 to a pipe, instrument mount, support bracket or other structure. In some embodiments, housing 12 also comprises coupling nut 22 for coupling field device/transmitter 10 to impulse tube 23 or another structure containing a process fluid. In these embodiments, sensor module 13 senses a pressure or other process parameter in impulse tubing 23, proximate field device 10. Alternatively, coupling nut 22 is replaced by a flange or flange adaptor assembly (see, e.g., FIG. 4), or another coupling element that forms a process fluid connection to field module 10.

In one particular embodiment, field device 10 is a 3051-series pressure transmitter, as available from Rosemount Inc. of Chanhassen, Minn., an Emerson Process Management company. Alternatively, field device 10 represents another transmitter or controller, or a more generalized field device. In these alternate embodiments the features of field device 10 vary, as illustrated by the wide range of process measurement and control devices available from Rosemount Inc. and other commercial vendors.

The particular location and geometrical configuration of electronics board 14 is also merely representative. In various embodiments electronics board 14 comprises a number of different circuit elements, including a controller or microprocessor for controlling field device 10, an I/O (input/output) interface for communicating between field device 10 and a process control system, and a heater controller for controlling heater 27, as described below.

Communications between field device 10 and a process control system comprise outputs representative of sensor signals, inputs representative of target values for control modules, and other process monitoring and control data. These communications utilize a variety of protocols including, but not limited to, standard analog (4-20 mA) protocols, hybrid analog-digital protocols such as HART®, and digital measurement and control protocols such as Fieldbus Foundation™ and PROFI®BUS or PROFI®NET.

Process communications take place over a combination of standard analog wire loops, data buses and other process management communications hardware. In some embodiments, communications utilize infrared (IR), optical, RF (radio-frequency) and other wireless means of communication, including HART®-based systems such as a 1420 wireless gateway or 3051S wireless transmitter, which are also available from Rosemount Inc.

Figure 2:
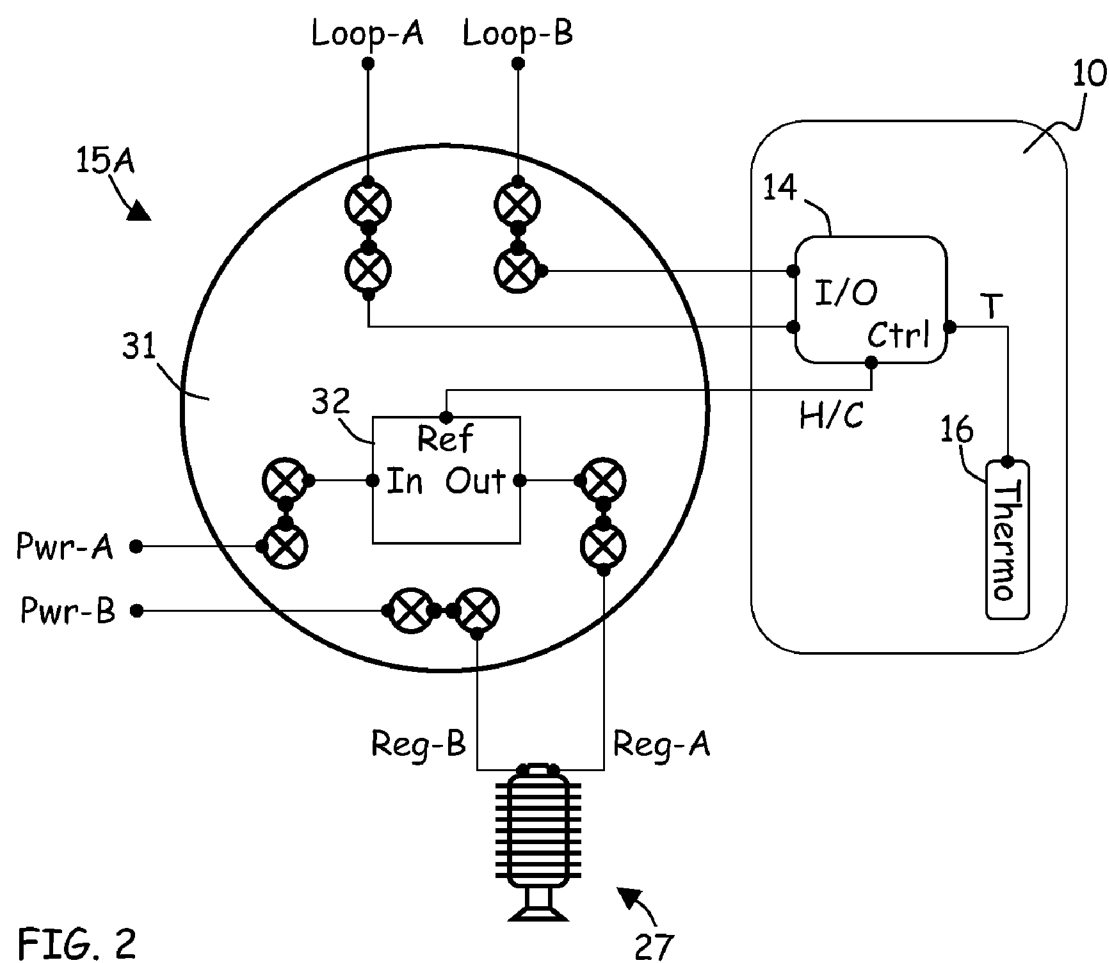
FIG. 2 is a schematic illustration of the dedicated terminal block shown in FIG. 1.
Figure 3:
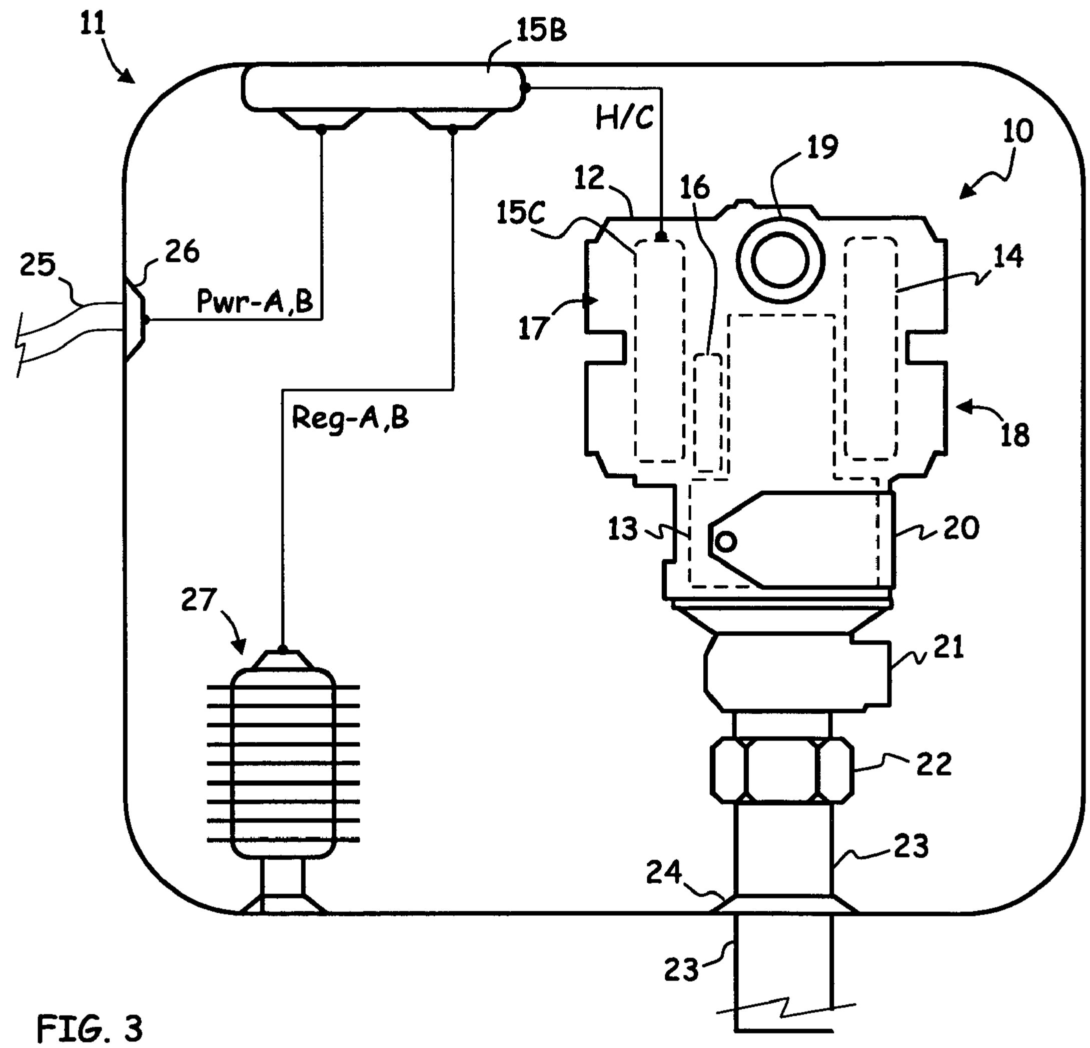
FIG. 3 is a cross-sectional schematic showing the field device in FIG. 1, in an embodiment utilizing an external regulator block.
Figure 4:
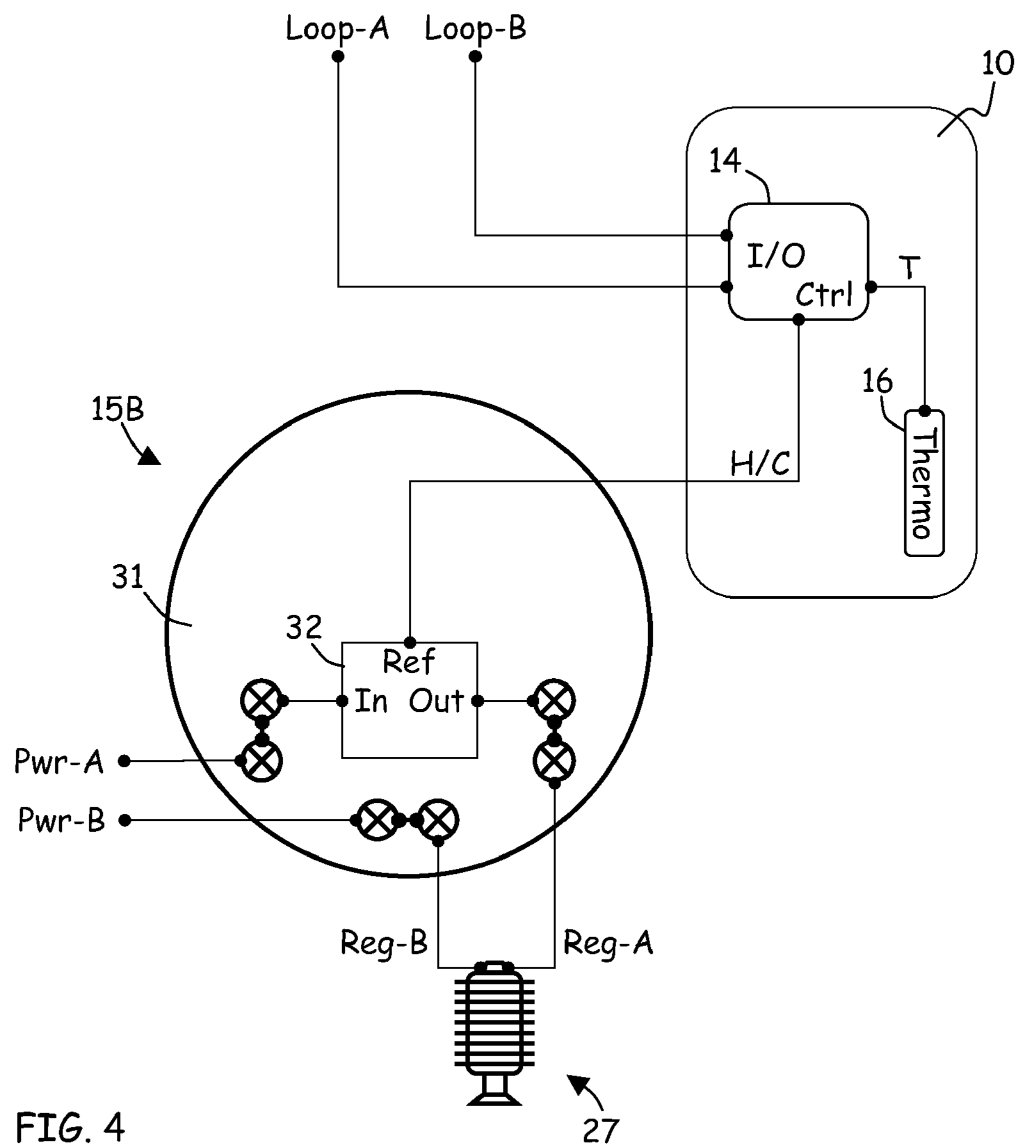
FIG. 4 is a schematic illustration of the external regulator block shown in FIG. 3.

Terminal block 15 connects heater 27 to a power supply, allowing the heat supplied to field device 10 to be regulated. In the embodiment of FIG. 1, terminal block 15 is a dedicated terminal block located inside field device 10, as shown in FIG. 1, with connections as illustrated in FIG. 2. In alternate embodiments terminal block 15 represents a standard internal terminal block and field device 10 utilizes an external regulator block, as shown in FIGS. 3 and 4.

Internal temperature sensor 16 is located inside field device 10. Internal sensor 16 characterizes the interior of the field device by generating a sensor signal as a function of an internal temperature. In various embodiments, internal temperature sensor 16 comprises a thermocouple, an RTD (resistance-temperature device), or another form of temperature sensor, with particular geometry adapted to fit within the internal structures of field device 10.

In some embodiments, temperature sensor 16 is a dedicated internal temperature sensor for environmental control. In these embodiments, temperature sensor 16 is configurable for location in various places within field device 10, providing direct environmental (temperature) control by sensing or characterizing the internal temperature proximate sensitive regions of the field device. This allows internal temperature sensor 16 to be located proximate process-wetted regions of field device 10, where freezing, condensation or temperature-dependent viscosity effects are of concern, or, alternatively, to be located proximate temperature-dependent internal components such as field module 13 or electronics board 14.

In other embodiments, internal temperature sensor 16 also provides a compensation signal for temperature compensation. In further embodiments, internal temperature sensor 16 is also a primary sensor module that characterizes a process fluid temperature as well as an internal temperature for the field device. In these embodiments, the location of temperature sensor 16 is also at least partly dependent upon its additional functionality.

Enclosure 11 comprises a durable material such as a metal or durable plastic, or a combination thereof. In some embodiments enclosure 11 is rigid, in order to provide mechanical protection. In other embodiments enclosure 11 comprises a soft or flexible insulating material, or a combination of rigid materials and soft or flexible materials.

Enclosure 11 covers at least part of field device 10, in order to protect the field device from ambient weather conditions and process-related temperature extremes. With heater 27, enclosure 11 protects field device 10 from low-temperature extremes and thermal minima. In some embodiments, enclosure 11 also shields field device 10 from sunlight and other radiant heat sources, in order to protect against high-temperature extremes and thermal maxima. In further embodiments, enclosure 11 protects field device 10 from explosive, corrosive, or other hazardous atmospheres.

Environmental enclosure 11 forms an enclosed volume around field device 10 to protect the field device by providing thermal, mechanical, and electrical insulation. In some embodiments enclosure 11 covers or encloses substantially all of field device 10 (as shown in FIGS. 1 and 3), and in other embodiments enclosure 11 covers or encloses only portions of field device 10 (see FIG. 5).

Enclosure 11 typically provides mounting structures to mount the enclosure, in order to enclose and protect field device 10. Enclosure 11 also typically provides a number of access ports for impulse tubing 23 and other process connections at process port or ports 24, for heater power supply cord 25 at power port 26, and additional ports for a loop wire, RF antenna, wireless IR device, or another means of communication with the process control system.

Heater 27 is a thermal source that converts electrical power to thermal energy, in order to heat enclosure 11 and field device 10. As show in FIG. 1, heater 27 is a convection-type heater that heats field device 10 indirectly through convection of air or another fluid inside environmental enclosure 11.

In other embodiments, heater 27 is a directly-coupled thermal source that heats field device 10 via thermal conduction, as described below with respect to FIG. 5. In some of these embodiments, housing 12 functions as a combined field device housing and temperature enclosure. In these embodiments no separate environmental enclosure 11 is required, as described below with respect to FIG. 6.

The heat provided to field device 10 is regulated or controlled by adjusting the thermal output of heater 27. The thermal output of heater 27, in turn, is determined by regulated power lines Reg-A and Reg-B, which are regulated by limiting the voltage or current of unregulated power supply lines Pwr-A and Pwr-B.

As shown in FIG. 1, unregulated power lines Pwr-A and Pwr-B connect from heater power supply cord 25 at power port 26 to terminal block 15. Regulated power lines REG-A and Reg-B connect from terminal block 15 to heater 27. The heater controller on electronics board 14 regulates the heater power at terminal block 15, as a function of the internal temperature characterized by internal temperature sensor 16.

More specifically, internal temperature sensor 16 senses an internal temperature within field device 10. The heater controller (represented by electronics board 14) regulates the heater power supply at terminal block 15, as a function of the internal temperature. When the internal temperature is above a particular minimum, no power is supplied to heater 27 and no heat is provided to field device 10. When the internal temperature drops below the minimum value, power is supplied to heat environmental enclosure 11 and field device 10, protecting from low-temperature extremes by limiting the temperature minima to which field device 10 would otherwise be exposed.

FIG. 2 is a schematic illustration of dedicated terminal block 15A for field device 10 as embodied in FIG. 1. Dedicated (internal) terminal block 15A is located inside field device 10, which distinguishes from embodiments using an external regulator block and a standard internal terminal block, as shown in FIGS. 3 and 4, below.

In general, a terminal block or regulator block comprises block body 31 and a number of terminal connections. Block body 31 typically comprises an insulating plastic, insulating resin, or an insulating filler material, or a combination thereof. Block body 31 supports the terminal connections and provides mounting structures to mount the terminal block to a field device, enclosure, or other structure.

In the particular embodiment of FIG. 2, dedicated terminal block 15A provides terminal connections between heater 27 and the power supply, and between electronics board 14 and loop wires for the process control system. Specifically, dedicated terminal block 15A provides connections from unregulated lines Pwr-A, B, which connect to the heater power supply, and regulated lines Reg-A and Reg-B, which connect to heater 27. Dedicated terminal block 15A also provides connections from loop wires Loop-A and Loop-B to an I/O interface represented by electronics board 14. Alternatively, dedicated terminal block 15A provides an alternate process control connection to a digital control bus or wireless communications device, as described above.

In general, electronics board 14 represents of a number of electronic components inside field device 10. These include an I/O interface that connects to the process control system, and a field device controller or microprocessor for controlling the field device. In addition, electronics board 14 represents a heater controller for controlling heater 27 as a function of an internal temperature of field device 10.

In the embodiment of FIG. 2, electronics board 14 comprises an integrated field device/heater controller that provides signal processing functions for the primary field module, directs communications with the process control system via the I/O interface, and also controls the temperature of field device 10 by regulating the power supply to heater 27. In this integrated controller embodiment, field device 10 does not require an additional external heater controller. This reduces complexity and cost, increases reliability, and lowers total power consumption.

Heater 27 is typically an AC heater, for which unregulated lines Pwr-A and Pwr-B provide standard AC power in the range of 50-60 Hz and 100-240 V. In alternate embodiments, heater 27 is a DC heater or a more generalized thermal source, and unregulated lines Pwr-A and Pwr-B provide either AC or DC power, at approximately 6 V, 12 V, 24 V, or another voltage appropriate to heater 27. In additional embodiments, heater 27 also employs a ground wire for a dedicated ground connection (not shown).

The heater controller regulates electrical power lines Reg-A and Reg-B via regulator 32 at terminal block 15A, in order to control the heat provided to the field device. Regulator 32 is an A/C or D/C power regulator, which limits the voltage or current in regulated lines Reg-A and Reg-B as a function of control or reference (Ref) signal H/C. The control signal, in turn, is a function of internal temperature signal T, as generated by internal temperature sensor 16.

In the particular embodiment of FIG. 2, regulator 32 regulates the voltage or current of unregulated "hot" line Pwr-A (In) to produce regulated line Reg-A (Out), while "return" line Pwr-B connects directly to regulated line Reg-B. The particular connections shown in FIG. 2, however, are merely representative. In other embodiments, line Pwr-B is regulated, and in further embodiments both Pwr-A and Pwr-B are regulated. A dedicated ground wire or ground connection is also sometimes employed, as described above.

While regulator 32 is shown proximate terminal block 15A, this location is also merely representative. In some embodiments regulator 32 is located on or incorporated into the terminal block, and in other embodiments regulator 32 is remotely located. In remotely located embodiments, the heater controller regulates power at terminal block 15A (or an external regulator block) via additional terminal connections to regulator 32, or to another remotely located voltage or current controller.

Because the power to heater 27 is regulated as a function of the internal temperature of field device 10, temperature control is more direct that in other systems utilizing external temperature sensors. This more effectively and efficiently protects field device 10 from low-temperature extremes, because the control input is more representative of the actual temperature of interest. In particular, the heat provided to field device 10 is more directly regulated than in other systems that rely upon external (indirect) temperature signals characterizing enclosure 11, rather than internal (direct) temperature signals charactering field device 10.

FIG. 3 is a cross-sectional schematic showing field device 10 in an embodiment utilizing external regulator block 15B. Field device 10 comprises housing 12, primary field module 13, electronics board 14 and internal temperature sensor 16, as described above. In contrast to the embodiment of FIG. 1, FIG. 3 shows field device 10 with standard internal terminal block 15C in place of dedicated (internal) terminal block 15A, and the power supply to heater 27 is regulated at external regulator block 15B instead.

In the external regulator block embodiment of FIG. 3, the terminal block structure comprises both external block 15B for regulating the power supply to heater 27 as a function of the internal temperature, as characterized by internal sensor 16, and internal block 15C for connecting the integrated heater/field device controller to external block 15B, and to the process control system. Thus the advantages of direct temperature control are retained, as described above. In the embodiment of FIG. 3, however, power connections are made at external regulator block 15B, which is located outside field device 10, rather than inside the field device.

In this embodiment, unregulated power lines Pwr-A and Pwr-B connect from power supply cord 25 at power port 26 to external regulator block 15C, and regulated power lines Reg-A and Reg-B connect from external regulator block 15C to heater 27. Thus none of the power lines (either regulated or unregulated) connect to field device 10, or even pass through the field device. This configuration has advantages for the operation of field device 10 in hazardous environments, as described immediately below.

FIG. 4 is a schematic illustration of external regulator block 15B for field device 10, as embodied in FIG. 3. In this embodiment, external regulator block 15B comprises block body 31, as described above, and a number of terminal connections for unregulated power lines Pwr-A and Pwr-B, regulated power lines Reg-A and Reg-B, and control signal H/C. The process control connections, for example loop wires Loop-A and Loop-B, do not connect to external regulator block 15B. Instead, the process control system connects to field device 10 via standard internal terminal block 15C, as shown in FIG. 3, above.

The external regulator block configuration of FIG. 4 isolates field device 10 from the heater supply line voltages, which are sometimes associated with increased signal noise or the potential for sparking, shorts and other electrical hazards. Unregulated power lines also pose safety certification concerns, particularly if they provide standard 110-240V A/C line power or DC line voltages that exceed hazardous environment standards. The external regulator block configuration also allows a standard terminal block to be used inside field device 10, as long as it provides a terminal connection for heater control line H/C.

As with the dedicated terminal block design of FIG. 2, external regulator block 15B provides more direct temperature control by regulating heater 27 as a function of an internal temperature rather than external temperature. Electronics board 14 also continues to be configurable with an integrated controller, replacing the standard external heater controller of previous designs.

In some embodiments, external regulator block 15B and power regulator 32 are located inside an environmental enclosure, as show in FIG. 3, above. In other embodiments external regulator block 15B and power regulator 32 are comprised within heat source 27. In these embodiments heat source 27 comprises a regulated heat source with a control input for heater control line H/C or another control line, and no separate regulator components are required.

Figure 5:
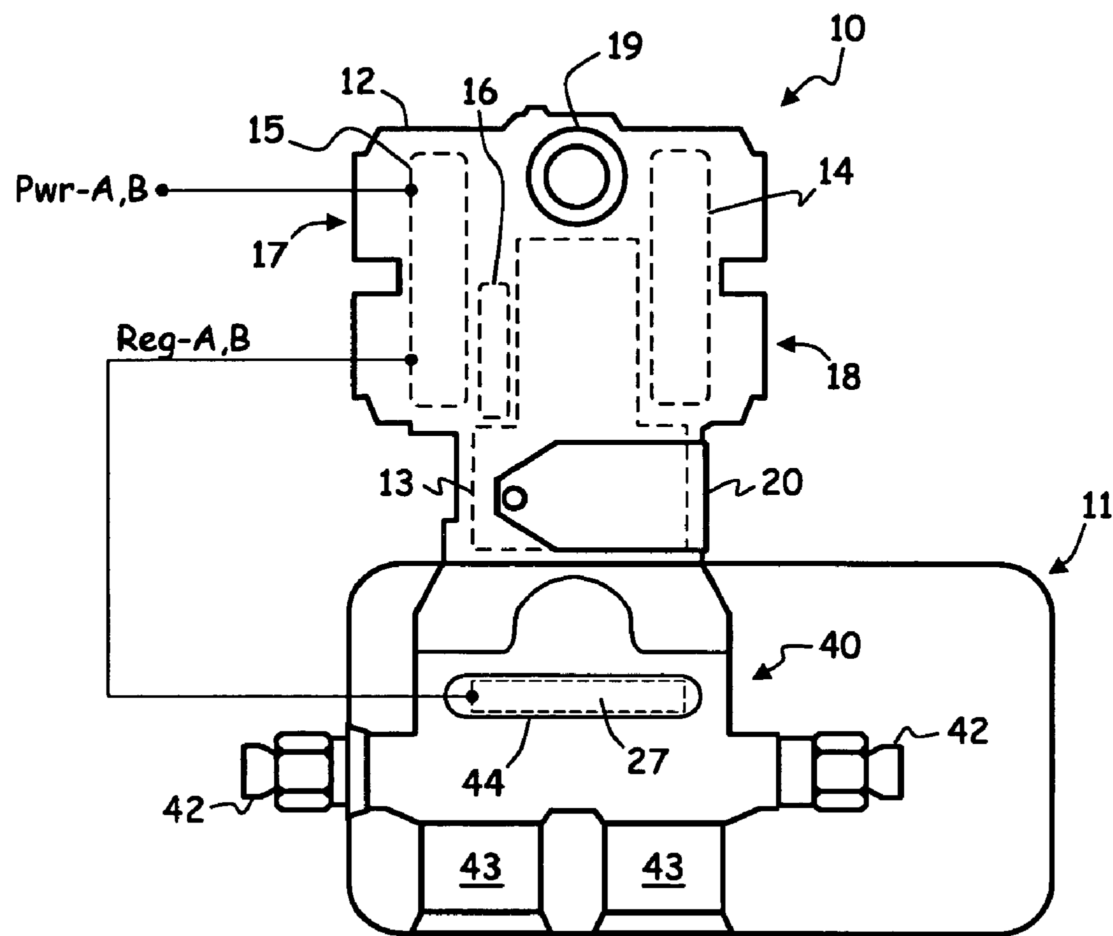
FIG. 5 is a cross-sectional schematic showing the field device in FIG. 1, in an embodiment utilizing a directly coupled heating element.

FIG. 5 is a cross-sectional schematic showing field device 10 in an embodiment utilizing directly coupled heating element 27. In this embodiment, field device 10 comprises housing 12, primary field module 13 and electronics board 14, as described above. In contrast to the fully-enclosed embodiments of FIGS. 1 and 3, however, FIG. 5 illustrates a partially enclosed embodiment in which enclosure 11 covers at least the process-wetted portions of field device 10, but not necessarily all of field device 10.

As shown in FIG. 5, housing 12 comprises terminal cover 17, transmitter cover 18, conduit connection 19 and nameplate 20, as described above, but with flange assembly 40 in place of coupling nut 23 (see FIG. 1). Flange assembly 40 takes on a variety of forms, including a coplanar flange assembly or valve manifold to provide drain/vent and other valve or process connections 42, with or without flange adapters 43. As with the other components of housing 12, these elements vary among embodiments. A representative range of configurations is available from Rosemount Inc. and other commercial vendors.

In general, enclosure 11 provides an environmentally controlled region in which heater 27 limits the low-temperature extremes to which field device 10 would otherwise be exposed. In fully enclosed (fully covered) embodiments, substantially the entire field device is protected by the enclosure, which sometimes extends to related process fluid-containing structures such as impulse tubing as well. In partially-enclosed (partially covered) embodiments, enclosure 11 typically covers at least process-wetted portions of field device 10, as shown in FIG. 5, to protect from freezing and overly viscous process fluid conditions. Alternatively, enclosure 11 covers regions of temperature-sensitive electronics to protect from temperature-dependent response effects, or enclosure 11 covers another critical area of field device 10 to protect from other low-temperature effects.

As shown in FIG. 5, field device 10 comprises dedicated terminal block 15, and does not require an external regulator block. This corresponds to the configuration of FIG. 1, with block connections represented in FIG. 2. In other embodiments, field device 10 comprises a standard internal terminal block with a heater control connection, and there is an external regulator block as shown in FIGS. 3 and 4. Alternatively, heat source 27 is an internally regulated heater, which comprises the external regulator block as described above.

In the direct thermal coupling embodiment of FIG. 5, heater 27 is a generalized heat source comprising an AC or DC heater or a generic resistive heating element configurable into a variety of forms and geometries. In one embodiment, heat source 27 is flexible resistive-type heater such as a resistive heat tape, which is thermally coupled by mechanical attachment to field device 10, for example proximate nameplate 20 or flange assembly 44. In other embodiments, heat source 27 is a “stick-type” or other resistive heater with a variety of specific geometric forms, which is thermally coupled to field device 10 via a recess, receptacle, pocket or cavity in flange assembly 40, for example receptacle 44 in a valve manifold or flange. In these embodiments, an epoxy or other material is sometimes use to enhance the thermal coupling between heat source 27 and field device 10, and to mechanically attach heat source 27 to field device 10 at receptacle 44.

In contrast to convective heating embodiments, as illustrated by FIGS. 1 and 3, directly-coupled thermal source 27 in FIG. 5 is provided with a direct thermal coupling to field device 10. This provides more direct environmental control and greater flexibility in system design. In particular, direct thermal coupling between heat source 27 and field device 10 provides more efficient temperature control because heat source 27 provides heat (thermal energy) directly to field device 10, rather than indirectly to the interior of enclosure 11.

In addition, directly-coupled heat source 27 is locatable at critical areas of field device 10, such as process wetted portions or near temperature-sensitive internal components. This provides more effective protection against low temperature extremes, with faster response than previous designs that rely on indirect convective heating or radiant heating. In particular, directly-coupled heat source 27 provides heat directly to field device 10, rather than indirectly heating the field device by first heating enclosure 11. Direct thermal coupling also reduces heat losses, providing more efficient temperature control and reducing the power requirements of heat source 27.

Figure 6:
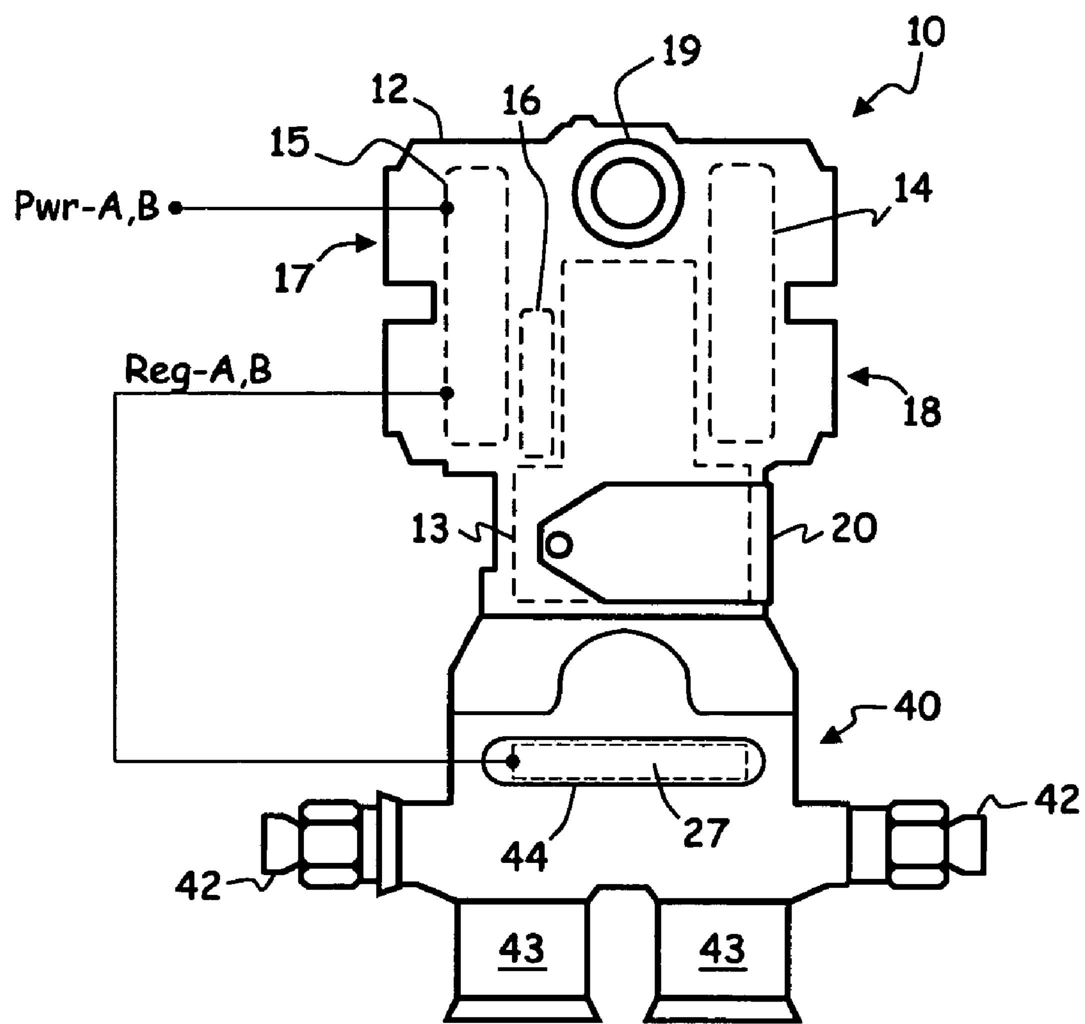
FIG. 6 is a cross-sectional schematic showing the field device in FIG. 5, in an embodiment utilizing a combined housing and environmental enclosure.

FIG. 6 is a cross-sectional schematic showing field device 10, in an embodiment utilizing combined housing and environmental enclosure 12. In this embodiment, housing 12 encloses primary field module 13 and electronics board 14, as described above, and further performs the function of environmental enclosure 11, as show in FIGS. 1, 3 and 5.

FIG. 6 shows that housing 12 sometimes serves as an integrated field device housing and environmental enclosure. In these integrated housing/enclosure embodiments, housing 12 encloses the field device and also protects internal components against low-temperature extremes, by retaining the heat provided by directly coupled heat source 27.

In some embodiments, heat source 27 is directly coupled at a valve manifold or flange-assembly, as shown in FIG. 6. In other embodiments, heat source 27 is directly coupled to field device 10 by being located inside housing 12, proximate field module 13, electronics board 14, terminal block 15 or another internal component of the field device. Each of these integrated housing/enclosure embodiments provides a simpler, more compact, and more efficient temperature-controlled design, in which there is no need for a distinct environmental enclosure.

As shown in FIGS. 1-6, more direct temperature control provides significantly greater flexibility in the design of temperature controlled field devices. These advantages are particularly valuable in remote and limited-access installations, where power consumption is a substantial concern or where previous designs are simply too large to be effectively deployed. In particular, environmental control based on an internal temperature sensor reduces power consumption and eliminates a number of discrete heater controller elements, increasing efficiency and reliability while reducing production and installation costs. More direct heater control also reduces the size requirements for environmental enclosure, and, in some embodiments, eliminates the need for a separate enclosure altogether.

Although the present invention has been described with reference to preferred embodiments, the terminology used is for the purposes of description, not limitation. Workers skilled in the art will recognize that changes may be made in form and detail without departing from the spirit and scope of the invention.

The invention claimed is:

1. A field device with integrated temperature control, the field device comprising:

a housing;

a sensor module located inside the housing;

a heat source;

a temperature sensor located inside the housing, wherein the temperature sensor senses an internal temperature of the field device;

a heater controller located inside the housing, wherein the heater controller controls the internal temperature by regulating a current provided to the heat source; and a terminal block connected to the heat source and the heater controller;

wherein the heater controller regulates the current to the heat source at the terminal block, as a function of the internal temperature.

2. The field device of claim 1, wherein the terminal block is located inside the housing and wherein the terminal block connects the field device to a process control system.

3. The field device of claim 1, wherein the terminal block comprises an external block located outside the housing and an internal block located inside the housing, and wherein the internal block connects the heater controller to the external block and to a process control system.

4. The field device of claim 3, wherein the heater controller regulates the current to the heat source at the external block.

5. The field device of claim 1, wherein the heat source provides the heat to the field device via a direct thermal coupling.

6. The field device of claim 5, wherein the direct thermal coupling comprises a receptacle for receiving the heat source.

7. The field device of claim 1, wherein the sensor module comprises a pressure sensor.

8. The field device of claim 1, further comprising an environmental enclosure that covers at least process-wetted portions of the field device.

9. The field device of claim 8, wherein the heat source heats the field device through convection of fluid inside the environmental enclosure.

10. A transmitter with internal temperature control, the transmitter comprising:

a housing;

a primary sensor module for sensing a process parameter, wherein the primary sensor module is located inside the housing;

a temperature sensor for sensing an internal temperature of the transmitter, wherein the temperature sensor is located inside the housing;

a heater for heating the transmitter;

a heater controller for controlling the internal temperature, wherein the heater controller regulates power supplied to the heater as a function of the internal temperature; and a terminal block connected to the heater controller and the heater;

wherein the heater controller is located inside the housing and controls the internal temperature by regulating the power supplied to the heater at the terminal block.

11. The transmitter of claim 10, wherein the terminal block comprises an internal terminal block located inside the housing connecting the controller to a regulator for regulating the power supplied to the heater, and connecting the transmitter to a process control system.

12. The transmitter of claim 10, wherein the terminal block comprises an external regulator block located outside the housing connecting the controller to a regulator for regulating the power supplied to the heater, and an internal terminal block located inside the housing connecting the controller to the external regulator block and to a process control system.

13. The transmitter of claim 10, wherein the primary sensor module comprises a pressure sensor.

14. The transmitter of claim 10, wherein the primary sensor module comprises a flow sensor.

15. The transmitter of claim 10, wherein the heater is directly thermally coupled to the transmitter.

16. The transmitter of claim 10, further comprising an environmental enclosure that covers at least process-wetted portions of the transmitter.

17. A method for controlling an internal temperature of a field device, the method comprising:

sensing a process parameter with a sensor module located inside the field device;

heating the field device with a heater thermally coupled to the field device;

generating an internal temperature signal with a temperature sensor located inside the field device; and controlling the heater with a heater controller located inside the field device;

wherein the heater controller regulates electrical power supplied to the heater at a terminal block, as a function of the internal temperature signal.

18. The method of claim 17, wherein controlling the heater comprises providing a control signal to a power regulator on the terminal block, and wherein the power regulator regulates the electrical power supplied to the heater.

19. The method of claim 18, wherein controlling the heater further comprises providing the control signal to the power regulator on a terminal block located inside the field device.

20. The method of claim 17, further comprising enclosing the heater and at least process wetted portions of the field device with an environmental enclosure.

* * * * *